Oct. 4, 1960 B. M. MINDES 2,955,199

RADIO DIVERSITY RECEIVING SYSTEM

Filed Aug. 5, 1958

Inventor
BARRY M. MINDES
By Alfred C. Hill
Agent

United States Patent Office 2,955,199

Patented Oct. 4, 1960

2,955,199

RADIO DIVERSITY RECEIVING SYSTEM

Barry M. Mindes, New York, N.Y., assignor to International Telephone and Telegraph Corporation, Nutley, N.J., a corporation of Maryland Filed Aug. 5, 1958, Ser. No. 753,247

17 Claims. (Cl. 250—20)

This invention relates to diversity systems and more particularly to frequency diversity radio reception of angularly modulated carrier waves, such as for example, frequency or phase modulated carrier waves.

In the copending applications of F. T. Altman et al., filed February 2, 1958, Serial No. 719,181, and William Sichak et al., filed February 21, 1958, Serial No. 716,594, both entitled "Radio Diversity Receiving System," there is described a diversity combining system which has become known as a linear adder or equal gain combining system. In each of these applications the diversity signals, whether frequency, space or time diversity signals, are combined prior to the limiting and detection operation of an FM (frequency modulation) receiver, thereby enabling the employment of common subceiver equipment for a plurality of diversity receiving channels. Each of these copending applications describes various embodiments of a phase control system to adjust the phase of the signals being combined with respect to each other to insure that the signals have a common frequency, are substantially time coincident and are in a predetermined phase relationship so that the maximum additive effect is obtained when the signals are combined.

The Altman et al. copending application describes various embodiments of the combining system for combining the received signals at the intermediate frequency (IF) level which incorporates at least two receiving channels, each having a mixer and an oscillator associated therewith to produce the IF signals for combining. The phase control is accomplished by adjusting the frequency of the oscillators with respect to each other in response to a control signal indicative of the phase difference between the signals being combined to cause frequency, phase and time coincidence of the IF signal for proper combining.

The Sichak et al. copending application describes other embodiments for combining the received signals at the radio frequency (RF) level which incorporates two RF receiving channels and includes an arrangement to modulate the signal of one channel prior to combining by a signal which will not interfere with or distort the modulation of the received signal. The signals of the receiving channels are then combined, applied to a common IF amplifier system and a portion of the output of the IF amplifier system is coupled to a detector to detect variations in the induced modulation component, said variations being a measure of the phase difference of the signals of the received channels. The detected variations are compared with the phase of the induced modulation to produce a control signal which is employed to adjust the phase of the signal of the other channel prior to combining to provide the desired phase relationship between the received signals for combining in a maximum additive manner.

When the systems of the copending applications are employed in a frequency diversity receiving system, it is necessary to provide for each channel an independent heterodyning system; that is, each channel includes a mixer and local oscillator, said mixer and local oscillator providing the same difference signal at the output of each heterodyning system. Further, the frequency of the oscillators of each channel having the same relationship with respect to the frequency of the received signals; that is, all oscillator frequencies are above the signal frequency or all oscillator frequencies are below the signal frequency. The phase control signal is coupled to a component of one of the channels to control the phase of the signal therein with respect to the phase of the signal of the other channel to provide the desired maximum addition of the channel signals when combined.

An object of the present invention is to provide an improved frequency diversity receiving system.

Another object is to provide a linear adder frequency diversity combining system which reduces by a factor of two the number of local oscillators and simplifies the frequency and phase control arrangement employed in the systems of the above-identified copending applications.

Still another object is to provide a linear adder frequency diversity combining system which results in an improvement in the signal-to-noise ratio, usually 3 db.

A further object is to provide an automatic phase control system to correct the phase of two difference frequency signals in opposite directions relative to each other to cause phase coincidence.

A feature of this invention is the provision of a single variable frequency oscillator having its output frequency disposed at the median frequency between the frequencies of the two received frequency diversity signals, a heterodyne arangement to heterodyne the oscillator signal frequency with the frequencies of the received signals to produce two identical IF signals and an arrangement to detect a phase difference between the two IF signals to produce a control signal proportional to said phase difference. This control signal is utilized to vary the frequency of the variable frequency oscillator to thereby adjust the frequency of the output signal therefrom in a manner to correct the phase relation between the IF signals to be in a predetermined phase relationship with respect to each other for maximum additive combining of the two IF signals.

Another feature is the provision of one form of means to detect the phase difference between the IF signals including a phase detector coupled to the output of the heterodyning means which is responsive to the IF signals to compare the phase relationship thereof and to produce a control signal proportional to the phase difference between said IF signals. The control signal is utilized to control the frequency of the oscillator to place the IF signals in the desired phase relationship for additive combining.

Still another feature is the provision of another form of means to detect the phase difference between the IF signals including a source of modulating signals having a frequency which will not interfere with or distort the normal modulation of the received signals to modulate the signal of the single oscillator, a means to combine the IF signals and a means to detect variations in the induced modulation, said variations of the induced modulation being a measure of the phase difference between the IF signals. This variation is then compared with the phase of the induced modulation to produce a control voltage to adjust the frequency of the single oscillator to correct the phase relationship of the IF signals for maximum additive combining.

A further feature is the provision of a single receiving channel to receive both of the frequency spaced signals including a mixer responsive to the received signals and the signal of the single oscillator to produce two identical IF signals. The signal of the oscillator is modulated by a signal which will not interfere with or distort the normal modulation of the received signal. The variation of the induced modulation, a measure of the phase difference between the IF signals, is detected and compared with the phase of the induced modulation to prouce a control voltage which is utilzed to adjust the frequency of the oscillator to correct the phase relationship of the IF signals for the maximum additive combining effect.

The above-mentioned and other features and objects of this invention will become more apparent by reference to the following description taken in conjunction with the accompanying drawings, in which.

Figures 1, 2:
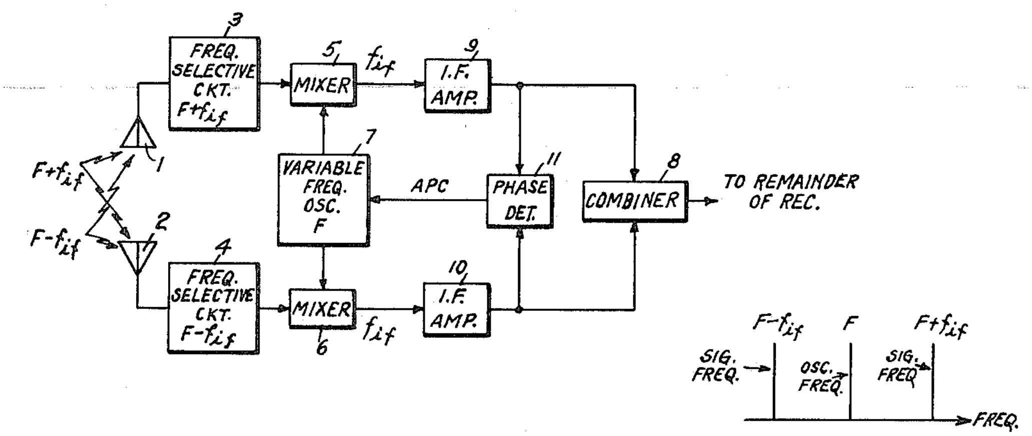
Fig. 1 is a schematic diagram in block form of one embodiment of the frequency diversity combining system of this invention.
Fig. 2 is a graphical representation illustrating the relationship between the single local oscillator frequency and the received frequency spaced signals.

Referring to Fig. 1 of the drawing, diversity signals carrying the same intelligence but spaced in frequency so that they are uncorrelated and subjected to different phase changes are received on antennas 1 and 2. Each of the received signals are segregated into their own receiving channel by means of frequency selected circuits 3 and 4. For instance, circuit 3 will pass the received signal $F+f_{\text{if}}$, while circuit 4 will pass only the received signal $F-f_{\text{if}}$. The outputs of circuits 3 and 4 could constitute first and second signal sources whose outputs are coupled respectviely to mixers 5 and 6.

A single variable frequency oscillator indicated at 7 in Fig. 1 has an output frequency which is disposed at the median frequency between the frequencies of the received signals. This frequency relationship between the received signals and the signal of oscillator 7 is graphically illustrated in Fig. 2. When the output of oscillator 7 is mixed or heterodyned with the received signals in mixers 5 and 6, there are produced two identical IF signals indicated in the drawing as $f_{\text{if}}$. The resultant IF signals are the difference signals resulting from the beating of the oscillator frequency with each of the received frequencies. The relation between the oscilaltor signal frequency and the received signal frequencies is such that the two identical IF signals occur at a frequency on opposite sides of the oscillator frequency signal.

The output from mixers 5 and 6 are coupled to combiner 8 wherein it is desired to combine the two identical IF signals in a maximum additive relationship. To assure this maximum additive relationship, it is necessary that the two identical IF signals are in a predetermined phase relationship so that when combined in combiner 8 they will add substantially in phase. Combiner 8 could take the form of a hybrid circuit which will combine the signals applied thereto in a linear fashion. The two IF signals can be coupled to combiner 8 as illustrated in Fig. 1 by IF amplifiers 9 and 10. The output of combiner 8 is coupled to the remainder of the common receiver for utilization.

In accordance with the system of Fig. 1, the means for detecting a phase difference between the identical IF signals includes phase detector 11 which is responsive to the two IF signals. Phase detector 11 may take the form of a balanced modulator and is so designed as to produce a zero voltage output when the two IF signals add in phase in combiner 8 and a positive or negative voltage having a magnitude dependent upon the relative phase difference between the two IF signals. The resultant control signal output of detector 11 is coupled to oscillator 7 to adjust the frequency thereof in accordance with the control signal to bring the two IF signals into the desired phase relationship for additive combining in combiner 8. One way of varying the frequency of oscillator 7 is to employ the well-known reactance tube. Due to the location of the oscillator frequency at the median frequency between the two received signals, the control signal output of detector 11 will adjust the phase relationship between the two IF signals in a push-pull manner; that is, each of the received signals will be adjusted in phase in opposite directions such that each one of the IF signals is corrected half of the phase difference between two signals. This push-pull correction of phase occurs since the two IF signals are located such that one IF signal is below the frequency of oscillator 7 and the other IF signal is located at a frequency above the IF signal.

The received signals have been shown as coupled to two antennas 1 and 2. Alternatively these two received signals could be coupled to a single antenna with the frequency selection for channeling the received signals into a given receiving channel being accomplished by circuits such as frequency selected circuits 3 and 4.

Figure 3:
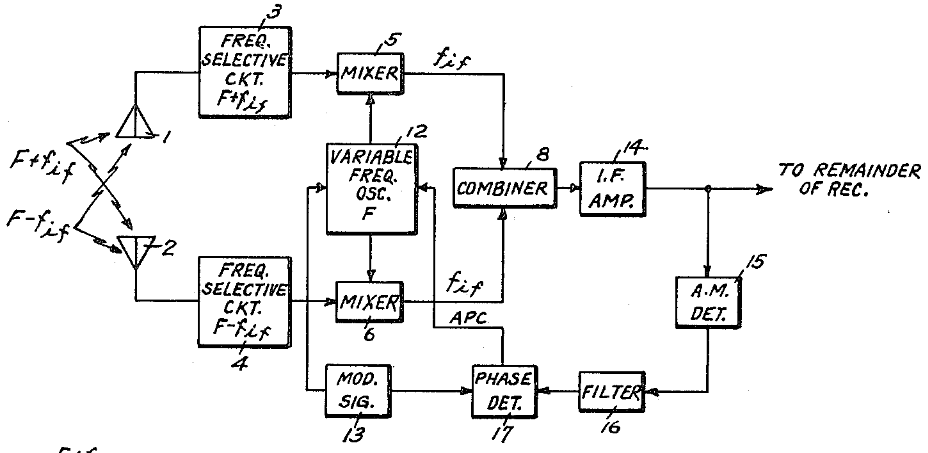
Figs. 3 and 4 are schematic diagrams in block form of other embodiments of frequency diversity systems following the principles of this invention.

Referring to Fig. 3, another embodiment of a frequency diversity linear adder combining system is illustrated following the principles of this invention. As in the case of the system of Fig. 1, the frequency spaced signals are received on antennas 1 and 2 with the received signals being separated and applied to their respective receiving channels by frequency selected circuits 3 and 4. As mentioned hereinabove with respect to Fig. 1, the frequency spaced signals may be intercepted and received on a single antenna and then segregated by circuits 3 and 4 into their respective receiving channels. The outputs of circuits 3 and 4 are coupled to mixers 5 and 6 as in the case of the system of Fig. 1. In accordance with the principles of this invention, a variable frequency oscillator 12 has the frequency of its output signal disposed at the median frequency between the two received frequencies which, when heterodyned in mixers 5 and 6 with the received signals, produces two identical IF signals, one located at a frequency above the local oscillator frequency and one located below the frequency of the local oscillator frequency. These two IF signals are coupled to combiner 8 which as before may take the form of a hybrid circuit and operates to combine the two IF signals substantially in phase to achieve the maximum additive result. As in the case of the system of Fig. 1, it is necessary that the two IF signals be in a predetermined phase relation with respect to each other to achieve the maximum additive resultant output from combiner 8. In the system of Fig. 3 the means for detecting the phase difference between the two IF signals and to produce a control signal proportional to this phase difference includes modulating signal source 13, the signal of which is applied to variable frequency oscillator 12 to frequency modulate the output signal of oscillator 12. The frequency of the signal of source 13 should have a value higher than the fading rate of the received signals and depends upon the type of communication being carried over the diversity system. For instance, for telephone channels arranged in conventional frequency division multiplex, any frequency in the guard bands can be used for the signal of the modulating signal of source 13 such as 3,500 cycles per second. For television, a frequency above the video band is suitable. It is important that the induced modulation is selected so as not to interfere with the normal modulation of the received signals. Hence, by frequency modulating the signal of oscillator 13, a small amount of frequency modulation is introduced into the two identical IF frequencies at the output of mixers 5 and 6. An action occurs in combiner 8 which amplitude modulates or otherwise varies the modulating frequency introduced by source 13 of said signal sources, means to heterodyne the signals of said signal sources and the signal of said source of oscillations to produce two identical intermediate frequency signals, means for detecting phase differences between said intermediate frequency signals to produce a control signal proportional to said phase difference and means to couple said control signal to said source of oscillations to adjust the frequency of the output signal therefrom to correct the phase relationship between said intermediate frequency signals to be in a predetermined phase relationship with respect to each other.

2. A system according to claim 1, wherein said detecting means includes a phase detector responsive to said intermediate frequency signals to compare the phase relationship therebetween.

3. A system according to claim 1, wherein said detecting means includes a source of modulating signal, means to couple said source of modulating signal to said source of oscillations to modulate said intermediate frequency signals, means to combine said intermediate frequency signals, a demodulator coupled to the output of said combiner means to detect the signals of said modulating source therein, said detected signals having variations therein according to the phase difference between said intermediate frequency signals, and a phase comparison means coupled to the output of said demodulator and the output of said modulating source to produce said control signal in accordance with said variations.

4. A system according to claim 3, wherein the signal of said source of modulating signal frequency modulates the signal of said source of oscillations and said demodulator includes an amplitude modulation detector.

5. A system according to claim 1, wherein said heterodyning means includes a mixer coupled to each of said first and second signal sources, means coupling the output of said source of oscillations to each of said mixers to produce said intermediate frequency signals and said detecting means includes a phase detector coupled to the output of each of said mixers to compare the phase relationship between said intermediate frequency signals.

6. A system according to claim 1, wherein said heterodyning means includes a mixer coupled to each of said first and second signal sources, means coupling the output of said source of oscillations to each of said mixers to produce said intermediate frequency signals and said detecting means includes a source of modulating signal, means to couple said source of modulating signal to said source of oscillations to frequency modulate said intermediate frequency signals, means coupled to the output of said mixers to combine said intermediate frequency signals, an amplitude modulation detector coupled to the output of said combiner means to detect the signals of said modulating source therein, said detected signals having variations therein according to the phase difference between said intermediate frequency signals, and a phase comparision means coupled to the output of said detector and the output of said modulating source to produce said control signal in accordance with said variations.

7. A system according to claim 1, wherein said heterodyning means includes a mixer coupled in common to the signals of said first and second signal sources, means coupling the output of said source of oscillations to said mixer to produce said intermediate frequency signals and said detecting means includes a source of modulating signal, means to couple said source of modulating signal to said source of oscillations to frequency modulate said intermediate frequency signals, an amplitude modulation detector coupled to the output of said mixer to detect the signals of said modulating source therein, said detected signals having variations therein according to the phase difference between said intermediate frequency signals and a phase comparison means coupled to the output of said detector and the output of said modulating source to produce said control signal in accordance with said variations.

8. A frequency diversity receiving system comprising means to receive two signals having a spaced frequency relationship and having an unknown and varying phase relationship relative to each other, an oscillator having an output signal whose frequency is disposed at the median frequency between the frequencies of said received signals, means to heterodyne the signal of said oscillator with said received signals to produce two identical intermediate frequency signals, means for detecting phase differences between said intermediate frequency signals to produce a control signal proportional to said phase difference, and means to couple said control signal to said oscillator to adjust the frequency of the output signal therefrom to correct the phase relationship between said intermediate frequency signals to establish a predetermined phase relationship therebetween for substantially in phase addition thereof.

9. A frequency diversity receiving system comprising means to receive two signals having a spaced frequency relationship and having an unknown and varying phase relationship relative to each other, an oscillator having an output signal whose frequency is disposed at the median frequency between the frequencies of said received signals, means to heterodyne the signal of said oscillator with said received signals to produce two identical intermediate frequency signals, means for detecting phase differences between said intermediate frequency signals to produce a control signal proportional to said phase difference, means to couple said control signal to said oscillator to adjust the frequency of the output signal therefrom to correct the phase relationship between said intermediate frequency signals to establish a predetermined phase relationship therebetween, and means to combine said intermediate frequency signals substantially in phase.

10. A system according to claim 9, wherein said heterodyning means includes a mixer coupled to each of said first and second signal sources, and means coupling the output of said source of oscillations to each of said mixers to produce said intermediate frequency signals.

11. A system according to claim 10, wherein said detecting means includes a phase detector coupled to the output of each of said mixers to compare the phase relationship between said intermediate frequency signals.

12. A system according to claim 10, wherein said detecting means includes a source of modulating signal, means to couple said source of modulating signal to said oscillator to modulate said intermediate frequency signals, a demodulator coupled to the output of said combiner means to detect the signals of said modulating source therein, said detected signals having variations therein according to the phase difference between said intermediate frequency signals, and a phase comparison means coupled to the output of said demodulator and the output of said modulating source to produce said control signal in accordance with said variations.

13. A system according to claim 12, wherein the signal of said source of modulating signal frequency modulates the signal of said source of oscillations and said demodulator includes an amplitude modulation detector.

14. A system according to claim 9, wherein said heterodyning means includes a mixer coupled in common to the signals of said first and second signal sources, and means coupling the output of said source of oscillations to said mixer to produce said intermediate frequency signals.

15. A system according to claim 14, wherein said combiner means includes said mixer.

16. A system according to claim 15, wherein said detecting means includes a source of modulating signal, means to couple said source of modulating signal to said oscillator to modulate said intermediate frequency signals, a demodulator coupled to the output of said mixer to detect the signals of said modulating source therein, in accordance with the phase difference between the two IF signals. Hence, this amplitude modulation of the frequency of source 13 is carried through IF amplifier and hence to the remainder of the receiver. Through proper filtering and detection at the output of the receiver, the induced modulation from source 13 can be eliminated. At the output of IF amplifier 14, amplitude detector 15 is responsive to the amplitude modulation contained on the signal of the output thereof. Detector 15 couples its detected output of the amplitude modulated components of the combined signal through filter 16, which is used to select the frequency of the signal of source 13 including therein the variations introduced by the phase difference of the two IF signals. The filtered output of amplitude detector 15 is coupled to phase detector 17 for comparison with the phase of the signal of source 13. The output from phase detector 17 constitutes a control voltage indicative of the phase difference between the two IF signals and is employed to control the frequency of oscillator 12 to adjust the phase relationship between the two IF signals for maximum additive combining in combiner 8. Although in Fig. 3 the output of source 13 and the output of detector 17 are illustrated as being coupled to oscillator 12 at two different points, this illustrated coupling is only for clarity of the drawing. The outputs of source 13 and detector 17 would be coupled to the same point in the circuit of oscillator 12, which, as pointed out with respect to oscillator 7 of Fig. 1, could be a reactance tube oscillator circuit to achieve a variable frequency oscillator which may be controlled in accordance with the principles of this invention.

The amplitude and phase at the output of detector 15 depends upon the phase difference between the two channel signals. If the frequency deviation of the two IF signals as induced by the signal of source 13 is equal and opposite, there is no output from detector 15. If the deviation of the IF signals as induced by the signal of source 13 has any other phase relationship, there will be a resultant amplitude signal whose polarity will depend upon the relative phase difference between the deviation present on the IF signals. It should be pointed out herein that the opposite deviation of the IF signals due to the signal of source 13 is brought about by the relationship of the local oscillator frequency and the two received signals. When the local oscillator frequency is disposed at the median frequency between the two received signals, any frequency deviation induced into the IF signal by frequency modulating the local oscillator would result in deviations of the IF frequencies in the opposite direction; that is, a positive swing of the local oscillator frequency due to the modulating signal will result in an IF signal which is less than the desired IF signal for the IF signal which is disposed above the local oscillator signal and an IF signal which increases in frequency for that IF signal which is disposed below the local oscillator frequency. When the local oscillator frequency decreases due to modulation of source 13, the reverse conditions of the IF signals result.

Figure 4:
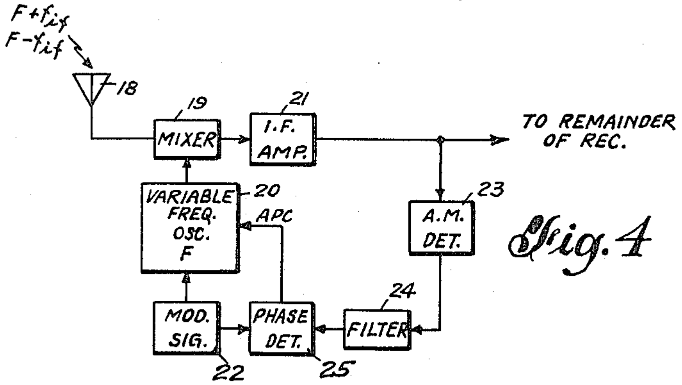

Referring to Fig. 4, still another embodiment of the frequency diversity linear adder combining system of this invention is illustrated. In this system the frequency spaced signals are induced on antenna 18 and the resultant signal is coupled to the single mixer 19. As in the previous embodiments variable frequency oscillator 20 has the frequency of its output signal disposed at the median frequency between the two received signal frequencies. The heterodyning action which takes place in mixer 19 results in two identical IF signals, one disposed at a frequency above the local oscillator frequency and one disposed at a frequency below the local oscillator frequency. These two IF signals are coupled through IF amplifier 21 and hence to the remainder of the receiver. It will be appreciated that the received signals in essence are combined in antenna 18. However, it should be remembered that for combining of diversity signals in accordance with the linear adder techniques, the signals being added together must have the same frequency. Through the action of mixer 19 and oscillator 20, two identical IF signals which may vary in phase with respect to each other are produced. It should be pointed out that the IF signals resulting at the output of mixer 19 need not be the final IF signal of the receiver. In other words, this could be the first frequency conversion of a double frequency conversion receiver such that the resultant IF or difference frequency is still at the RF level.

As in the system of Fig. 3, the means for detecting the phase difference between the two IF signals and to produce a control signal for correction thereof is accomplished by inducing a modulating signal from source 22 to frequency modulate the output of oscillator 20. The restrictions on the frequency of the signal of source 22 are the same in this system as they were in the system of Fig. 3. The induced frequency modulation in the two IF signals results, as in the case of the circuit of Fig. 3, in amplitude modulation in accordance with the phase difference between the two IF signals at the output of mixer 19 which in a sense is the combining circuit for the two IF signals. The amplitude modulation of the induced modulating signal is detected by amplitude detector 23 coupled to the output of amplifier 21. The detected output of detector 23 is passed through filter 24 to select the amplitude modulation components of the induced modulating signal for coupling to phase detector 24 wherein the filter detector output of detector 23 is phase compared with the signal of source 22. The phase difference resulting between the signals coupled to phase detector 25 produces a control signal which is proportional to the phase difference betwen the IF outputs of mixer 19 and is coupled to oscillator 20 to control the frequency thereof in a manner to correct the phase relationship between the IF signals to thereby place them in a predetermined phase relationship with respect to each other to achieve the desired maximum additive resultant output for coupling to the remainder of the receiver.

In the system of Fig. 4, besides decreasing the number of local oscillators employed in the combining system of the aforementioned copending applications, there is achieved an economic saving in the number of mixers required and also a resultant improvement in signal-to-noise ratio. It has been found that an improvement of approximately 3 db in signal-to-noise ratio is gained as a consequence of using one mixer as illustrated in the system of Fig. 4. This signal-to-noise improvement is achievede as follows. The noise output of a crystal mixer is essentially independent of the terminations on the mixer input terminals. The noise generated in the mixer crystals is also the only significant source of noise. By inserting two signals equally disposed above and below the local oscillator signal into the mixer and with proper phasing of the resultant signals at the output of the mixer, the signals will be converted to the same IF frequency and added linearly with noise being contributed from only the one mixer. When using two mixers, two times the amount of noise will be added to the signal. The one mixer case of Fig. 4 clearly represents a 3 db improvement in signal-to-noise ratio.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic phase control system comprising first and second signal sources, the signals of said sources having a spaced frequency relationship and having an unknown and varying phase relationship relative to each other, a source of oscillations whose frequency is the median frequency between the frequency of the signals said detected signals having variations therein according to the phase difference between said intermediate frequency signals, and a phase comparison means coupled to the output of said demodulator and the output of said modulating source to produce said control signal in accordance with said variations.

17. A system according to claim 16, wherein the signal of said source of modulating signal frequency modulates the signal of said source of oscillations and said demodulator includes an amplitude modulation detector.

References Cited in the file of this patent

UNITED STATES PATENTS

| | | |
|---|---|---|
| 2,042,831 | Crosby | June 2, 1936 |
| 2,108,088 | Tufts | Feb. 15, 1938 |
| 2,375,126 | Mathes | May 1, 1945 |
| 2,683,213 | Earp | July 6, 1954 |